April 5, 1966  L. W. BUCHEIT  3,244,438
SERVICE HEAD ADAPTER
Filed May 15, 1963

INVENTOR.
Louis W. Bucheit,
BY
Byron, Hume, Groen & Clement
ATTORNEYS

United States Patent Office 3,244,438
Patented Apr. 5, 1966

3,244,438
SERVICE HEAD ADAPTER
Louis W. Bucheit, Wheaton, Ill., assignor to Norton-McMurray Manufacturing Company, Chicago, Ill., a corporation of Illinois
Filed May 15, 1963, Ser. No. 280,537
1 Claim. (Cl. 285—15)

This invention relates in general to fluid transmission, and to conduit means therefor. It deals particularly with a coupling for lined gas pipes and the like.

It is presently considered conventional to line a deteriorating gas supply pipe with a slightly smaller plastic or synthetic rubber pipe or the like. Gas is transmitted through the liner pipe, which is supported by the original supply pipe. At a point where the supply pipe conventionally terminates and is tapped into the gas system of a residence, for examle, the liner pipe necessarily terminates also. At this point it is imperative that both the original supply pipe and its rejuvenating liner be joined to the internal gas system piping leading to a gas meter in the residence, for example.

The present invention, broadly concerned with a coupling for a lined gas pipe, is more specifically devoted to an adapter arrangement for joining the lined gas supply pipe in gas tight relationship to a residential internal gas system or the like.

It is an object of the present invention to provide a new and improved adapter arrangement for joining a lined gas supply pipe to an internal residential gas system or the like.

It is another object to provide an adapter arrangement which is effective to prevent gas from leaking to the atmosphere.

It is still another object to provide an adapter arrangement which assures the establishment of a superior seal regardless of spacing between the pipe liner and the original gas supply pipe.

It is yet another object to provide an adapter arrangement which establishes a three point seal between the original gas supply pipe, its internally telescoped liner, and the service head through which the adapter arrangement connects the lined gas supply pipe to the internal gas system of a residence, for example.

It is another object to provide an adapter arrangement which is relatively simple in construction and economical to incorporate in a gas system.

These and other objects are realized in accordance with the present invention by providing a new and improved adapter arrangement for joining a lined gas supply pipe to an unlined branch delivery pipe or the like, in gas tight relationship. Briefly, the invention contemplates establishing an improved three point seal at the juncture of a lined gas supply pipe and the service head of an internal gas system in a residence, for example, and preventing escape of gas from within the internal system to the atmosphere.

The invention, both as to its organization and method of operation, taken with further objects and advantages thereof, will best be understood by reference to the following description taken in connection with the accompanying drawings, in which.

Figure 1:
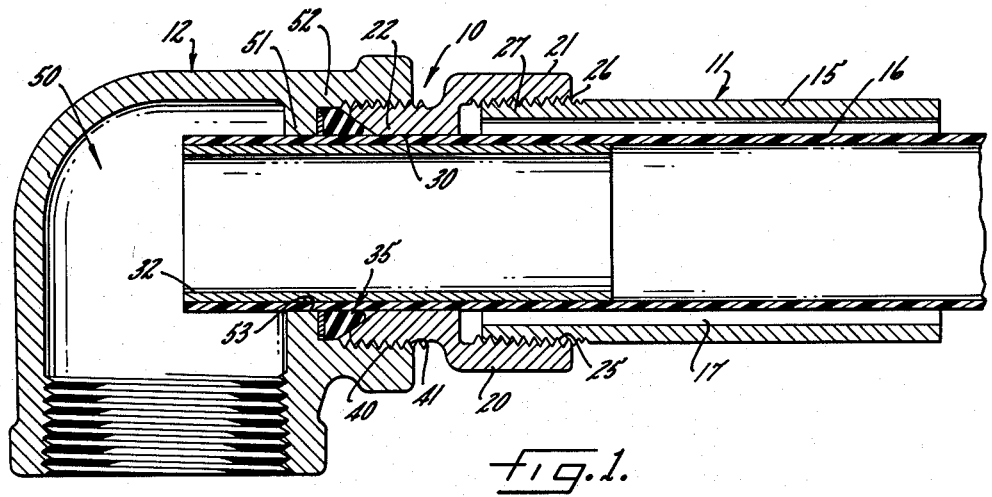
FIGURE 1 is a sectional view of a conventional lined gas supply pipe connected to the service head of a residential gas system by an adapter arrangement embodying features of the present invention.

Referring now to the drawings, and particularly to FIGURE 1, an adapter arrangement 10 embodying features of the present invention is illustrated joining a lined gas supply pipe assembly 11 to the surface head 12 of a residential gas system or the like (not shown). The lined gas supply pipe 11 includes a conventional copper or lead (for example) outer pipe 15, and a liner pipe 16 of slightly smaller diameter composed of plastic or synthetic rubber or the like. According to the present invention the adapter arrangement 10 connects the supply pipe assembly 11 to the service head 12 in gas tight relationship so that gas cannot leak from within the service head 12 to the atmosphere.

As is well known, defects are frequently developed in a supply pipe 15 over its service life through oxidation, chemically induced deterioration, and other untoward effects of the gas itself. Rather than completely replacing the supply pipe 15, it is common practice to line the supply pipe 15 with a liner pipe 16 and accordingly, virtually provide a new gas system. As would be expected in such circumstances, however, the problems encountered in sealing the liner pipe 16 and the supply pipe 15 together and to the service head 12 are knotty ones. The adapter arrangement 10 embodying features of the present invention effectively couples the supply pipe assembly 11 to the service head 12 in gas tight relationship to overcome such problems.

The adapter arrangement 10 includes an adapter collar 20 having an outer end section 21 of a pre-determined relatively large diameter and an inner end section 22 of a pre-determined relatively lesser diameter. The outer end section 21 is internally threaded, as at 25, to receive externally formed threads 26 on the free end 27 of the supply pipe 15. The threads 25 and 26 are not precision machined threads since the adapter arrangement 10 substantially prevents gas from reaching them and they need not have sealing effect. Avoiding the use of precision machined threads reduces the cost of the adapter arrangement 10 substantially, of course.

The inner end section 22 of the adapter collar 20 has a relatively wide, annular inner surface 30 of a diameter substantially equal to, or only slightly greater than the external diameter of the liner pipe 16. The liner pipe 16 extends relatively snugly through the inner end section 22 and tends to be supported on the surface 30.

As can readily be seen, a tubular sleeve insert 32 is provided inside the liner pipe 16. The sleeve insert 32 is composed of relatively rigid metal or plastic or the like and maintains the cylindrical integrity of the liner pipe 16 so that a gas seal may be established by the adapter arrangement 10 according to the present invention.

The inner end section of the adapter collar 20 cooperates with the service head 12 and a sealing assembly 35 to establish a three-point seal between the liner pipe 16, the service head 12, and the adapter collar 20. Accordingly, gas from within the service head 20 cannot escape to the atmosphere.

The inner end section 22 of the adapter collar 20 is externally threaded, as at 40, to receive internally formed threads 41 within the service head 12. The threads 40 and 41 are not precisioned machined threads, since a gas tight seal need not be established by the threads themselves, in accordance with the present invention. As has been pointed out with regard to the similar threads 25, 26, this contributes substantially to the economy of the adapter arrangement 10.

The service head 12 is, in this instance, a broadly conventional L coupling 50 modified in accordance with the present invention. The modification resides primarily in the fabrication of a shoulder 51 within one leg of 52 of the coupling 50. The shoulder 51 defines an annular surface 53 of a diameter substantially equal to, or only slightly greater than, the outside diameter of the pipe liner 16. Accordingly, the annular surface 53 tends to support the liner pipe 16.

Figure 2:
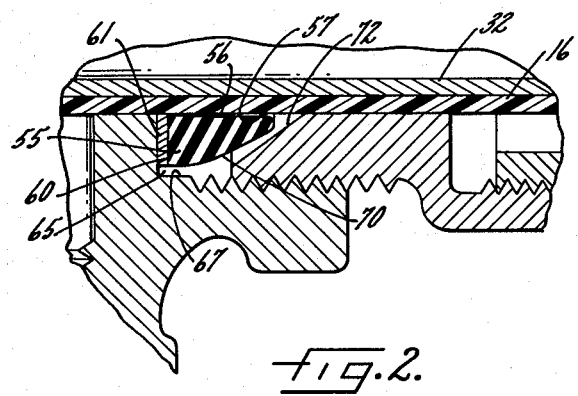
FIGURE 2 is an enlarged sectional view of a partially assemblied sealing assembly in the adapter arrangement embodying features of the present invention.
Figure 3:
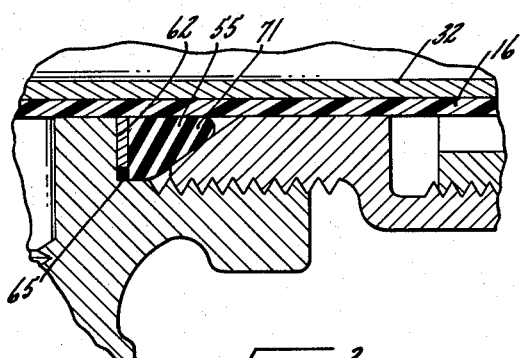
FIGURE 3 is an enlarged sectional view, similar to FIGURE 2, illustrating the sealing assembly in fully assembled sealing relationship.

The sealing assembly 35 is mounted between the shoulder 51 and the inner end section 22 of the adapter collar 20. Turning to FIGURES 2 and 3, the sealing assembly 35 is shown in substantial detail, both before and after sealing is established. As seen in FIGURE 2 before sealing, it includes a generally wedged shaped gasket 55 conventionally formed of rubber or the like. The rubber is preferably of a type which is resistant to corrosion by gas or impurities carried thereby, of course. The gasket 55 snugly encircles the liner pipe 16 and its annular inner face 56 is slightly frusto-conical to facilitate slipping the gasket 55 over the outer surface 57 on the liner pipe 16. According to the present invention, one of the three areas or points of sealing is established between the annular surfaces 56 and 57.

The gasket 55 further has a radially disposed, planar face 60 which is adapted to seat against a washer 61 surrounding the liner pipe 16 between the gasket 55 and the shoulder 51. A radially disposed planar surface 62 on the shoulder 51 provides an appropriate seat for the washer 61.

The outside diameter of the washer 61 is less than the inside diameter of the L coupling 50 at this point, leaving a gap 65 between the washer 61 and an annular inner surface 67 within the coupling 50 between the abutment face 62 and the threads 41. That portion of the abutment face 62 which is exposed in the gap 65, plus the annular inner surface 67, provide an irregular but smooth sealing surface for the gasket 55 when it is deformed by compression into the gap 65 as the L coupling 55 is screwed up onto the collar 20. This sealing area defines the second point of sealing according to the present invention.

It should also be pointed out here that the washer 61 tends to prevent frictionally induced deformation of the gasket 55 as the L coupling is screwed onto the collar 20. Such deformation is avoided because the washer 61 tends to rotate with the gasket, sliding on the shoulder 51 which would otherwise frictionally engage the gasket 55.

Still referring to FIGURE 2, the outer surface 70 of the gasket 55 is normally curved toward a relatively thin nose 71 on the gasket. The curved surface 70 is adapted to cooperate with substantially frusto-conical surface 72 formed on the free end 73 of the collar's inner end section 22 and define a third point or area of sealing according to the present invention.

Referring now to FIGURE 3, as the L coupling 50 is turned onto the collar 20 through the medium of the cooperating threads 40 and 41, pressure is brought to bear on the gasket 55 by the cooperating L coupling and the collar 20, as well as by the liner pipe 16. This pressure is exerted against the three surfaces, 56, 60 and 70, of the gasket 55. The surface 60 is deformed as the gasket 55 cold flows into the gap 65 between the washer 61 and the annular surface 67 formed within the leg 62 of the L coupling 50. The first area or point of sealing is effected between the gasket 55 and the surfaces defining the gap 65, as has been pointed out. Accordingly, gas is prevented from leaking out of the L coupling 50, behind the washer 61, to the threads 40, 41, and subsequently to the atmosphere.

At the same time the slightly frusto-conical inner surface 56 on the gasket 55 and the outer surface 57 on the liner pipe 16 are pressed into sealing engagement to establishment of the second area or point of sealing, according to the second invention, as has also been pointed out. Accordingly, gas is normally prevented from seeping along the surface of the liner pipe 16 back into the annular space 17 between the liner pipe and the gas supply pipe 15.

The frusto-conical surface 72 on the inner end section 22 of the adapter collar 20 and the curved surface 70 on the gasket 55 are pressed into sealing engagement to establish the third area or point of sealing according to the present invention, as has further been pointed out. Accordingly, if gas is somehow successful in seeping along the surface of the liner pipe 16, past the second point of sealing, it is prevented from reaching the threads 40, 41, and passing outwardly into the atmosphere within a residence, for example. If such leakage does occur, it is in minor quantities and the gas is retained in the annular space 17 between the liner pipe 16 and the original gas supply pipe 15.

It should now be recognized that an adapter arrangement has been illustrated and described which establishes a three-point seal at the juncture of a lined gas supply pipe and the service head of an internal gas system in a residence, for example. The adapter arrangement effectively prevents escape of gas from within the internal system to the atmosphere within or without a residence.

While an embodiment described herein is at present considered to be preferred, it is understood that various modifications and improvements might be made therein, and it is intended to cover in the appended claims all such modifications and improvements as fall within the true spirit and scope of the invention.

What is desired to be claimed and secured by Letters Patent of the United States is:

An adapter arrangement for joining a telescoped pipe and pipe liner to a service head in fluid tight relationship, comprising:

(a) an adapter collar encircling the liner and connected to the pipe at one end of the collar, (b) a generally frusto-conical inner surface formed in the other end of said collar, (c) an annular shoulder formed unitarily with and within the service head and encircling the liner, (d) a substantially planar annular surface on said shoulder facing said generally frusto-conical collar surface, (e) a substantially circular cylindrical surface formed within said service head immediately adjacent and co-extensive with said substantially planar shoulder surface, (f) said substantially circular cylindrical surface terminating in internal threads formed within said service head for cooperating with external threads on said other end of said collar to draw said collar and said service head together, (g) sealing means encircling the liner between said generally frusto-conical collar surface and said substantially planar shoulder surface, (h) said sealing means including a gasket having a generally wedge-shaped cross-sectional configuration including an inner face, an outer face, and a substantially planar end face, (i) said sealing means further including a washer encircling said liner and freely seated against said substantially planar shoulder surface, the outer diameter of said washer being less than the inner diameter of said cylindrical surface whereby a gap remains between said washer and said cylindrical surface exposing a peripheral portion of said planar shoulder surface, (j) a first sealing area being established between the gaskets substantially planar end face and outer face, and a portion of said substantially planar shoulder surface as well as said cylindrical surface co-extensive with said planar shoulder surface, said gasket being forced into said gap and against said cylindrical surface out to said internal threads, (k) a second sealing area being established between said inner face and the liner pipe, (l) and a third area being established between said outer face and said generally frusto-conical inner surface formed in the other end of said collar.

(References on following page)

References Cited by the Examiner

UNITED STATES PATENTS

| | | | |
|---|---|---|---|
| 1,956,724 | 5/1934 | Lueck | 285—356 X |
| 2,268,263 | 12/1941 | Newell et al. | 285—15 |
| 2,282,738 | 5/1942 | Moore | 285—348 |
| 2,546,348 | 3/1951 | Schuman | 285—15 |
| 2,709,606 | 5/1955 | Mueller et al. | 285—15 |
| 2,735,700 | 2/1956 | Bowan et al. | 285—348 X |
| 3,185,501 | 5/1965 | Bowan et al. | 285—348 X |

FOREIGN PATENTS

| | | |
|---|---|---|
| 162,245 | 3/1955 | Australia. |
| 490,548 | 8/1938 | Great Britain. |
| 829,069 | 2/1960 | Great Britain. |

CARL W. TOMLIN, *Primary Examiner.*

THOMAS F. CALLAGHAN, *Examiner.*